United States Patent
Wang et al.

(10) Patent No.: US 12,360,252 B2
(45) Date of Patent: Jul. 15, 2025

(54) POSITIONING METHOD AND COMMUNICATION APPARATUS IN SATELLITE NETWORK

(71) Applicant: HUAWEI TECHNOLOGIES CO., LTD., Shenzhen (CN)

(72) Inventors: Yu Wang, Hangzhou (CN); Rongdao Yu, Shenzhen (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 17/990,135

(22) Filed: Nov. 18, 2022

(65) Prior Publication Data

US 2023/0092925 A1 Mar. 23, 2023

Related U.S. Application Data

(63) Continuation of application No. PCT/CN2021/089029, filed on Apr. 22, 2021.

(30) Foreign Application Priority Data

May 21, 2020 (CN) .......................... 202010435378.X

(51) Int. Cl.
*H04W 24/10* (2009.01)
*G01S 19/25* (2010.01)
*H04W 64/00* (2009.01)

(52) U.S. Cl.
CPC ........... *G01S 19/256* (2013.01); *H04W 24/10* (2013.01); *H04W 64/00* (2013.01)

(58) Field of Classification Search
CPC .......................... H04W 4/029; H04W 56/005
(Continued)

(56) References Cited

U.S. PATENT DOCUMENTS 6,122,482 A * 9/2000 Green, Sr. .............. H04H 20/63
455/12.1
6,397,038 B1 * 5/2002 Green, Sr. ................ H04N 7/20
455/12.1
(Continued)

FOREIGN PATENT DOCUMENTS

| CN | 104459746 A | 3/2015 |
| CN | 106656330 A | 5/2017 |

(Continued)

OTHER PUBLICATIONS

C. Fernandez-Prades, L. L. Presti and E. Falletti, "Satellite Radiolocalization From GPS to GNSS and Beyond: Novel Technologies and Applications for Civil Mass Market," in Proceedings of the IEEE, vol. 99, No. 11, pp. 1882-1904, Nov. 2011, doi: 10.1109/JPROC.2011.2158032. (Year: 2011).*

(Continued)

*Primary Examiner* — William D Cumming
(74) *Attorney, Agent, or Firm* — Maier & Maier, PLLC

(57) ABSTRACT

A positioning method in a satellite network, a communication apparatus, a computer-readable storage medium, a program, and a program product are provided. The method includes: a terminal device receives a first broadcast signal block of a first satellite; obtains a measurement value of the first broadcast signal block; obtains positioning assistance information, from the first satellite, indicating a frequency and a polarization direction of the second satellite, where a frequency and/or a polarization direction of the first satellite are/is different from the frequency and the polarization direction of the second satellite; receives a second broadcast signal block of the second satellite based on the positioning assistance information; obtains a measurement value of the second broadcast signal block; and obtains location information of the terminal device based on the measurement (Continued)

value of the first broadcast signal block and the measurement value of the second broadcast signal block.

20 Claims, 7 Drawing Sheets

(58) Field of Classification Search
USPC .............................................. 455/12.1, 456.1
See application file for complete search history.

(56) References Cited

U.S. PATENT DOCUMENTS

| | | | | |
|---|---|---|---|---|
| 8,769,581 | B2* | 7/2014 | Chapman | H04N 21/47 725/54 |
| 11,792,606 | B2* | 10/2023 | Wiacek | H04W 56/005 455/456.1 |
| 2002/0066102 | A1* | 5/2002 | Chapman | H04N 21/2665 348/E7.063 |
| 2002/0094775 | A1* | 7/2002 | Green, Sr. | H04H 20/63 348/E7.093 |
| 2009/0293087 | A1* | 11/2009 | Chapman | H04N 21/6143 725/39 |
| 2014/0077991 | A1 | 3/2014 | Bar-Sever et al. | |
| 2021/0204096 | A1* | 7/2021 | Wiacek | H04W 4/029 |
| 2023/0092925 | A1* | 3/2023 | Wang | H04B 7/18547 455/456.1 |

FOREIGN PATENT DOCUMENTS

| | | | |
|---|---|---|---|
| CN | 110418402 | A | 11/2019 |
| CN | 111123317 | A | 5/2020 |
| CN | 110622566 | B | 4/2021 |
| WO | 2019194736 | A1 | 10/2019 |
| WO | 2020001821 | A1 | 1/2020 |
| WO | 2020074747 | A1 | 4/2020 |
| WO | WO-2021233059 | A1 * | 11/2021 ............. G01S 19/00 |

OTHER PUBLICATIONS

3GPP TR 38.821 V1.1.0, "3rd Generation Partnership Project; Technical Specification Group Radio Access Network; Solutions for NR to Support Non-Terrestrial Networks (NTN)", Release 16, http://www.3gpp.org, 3GPP Organizational Partners (ARIB, ATIS, CCSA, ETSI, TSDSI, TTA, TTC), Dec. 10, 2019, 143 pages.

5G-PPP, "5G Automotive Vision", Oct. 20, 2015, 67 pages.

3GPP TS 36.211 V15.8.0, "3rd Generation Partnership Project; Technical Specification Group Radio Access Network; Evolved Universal Terrestrial Radio Access (E-UTRA); Physical Channels and Modulation", Release 15, http://www.3gpp.org, 3GPP Organizational Partners (ARIB, ATIS, CCSA, ETSI, TSDSI, TTA, TTC), Dec. 2019, 239 pages.

3GPP TR 38.855 V16.0.0, "3rd Generation Partnership Project; Technical Specification Group Radio Access Network; Study on NR Positioning Support", Release 16, http://www.3gpp.org, 3GPP Organizational Partners (ARIB, ATIS, CCSA, ETSI, TSDSI, TTA, TTC), Mar. 2019, 197 pages.

Shamaei et al., "Exploiting LTE Signals for Navigation: Theory to Implementation", IEEE Transactions on Wireless Communications, Apr. 2018, vol. 17, No. 4, 17 pages.

Fernandez, "Inter-Satellite Ranging and Inter-Satellite Communication Links for Enhancing GNSS Satellite Broadcast Navigation Data", ScienceDirect, Advances in Space Research, COSPAR, Elsevier Ltd., May 2011, vol. 47, No. 5, pp. 786-801.

Yang, "Self-Calibrating Position Location Using Signals of Opportunity", ResearchGate, in Proc. ION GNSS, Jan. 2009, 10 pages.

Kangas et al., "Positioning in LTE", Handbook of Position Location: Theory, Practice, and Advances, Second Edition, Institute of Electrical and Electronics Engineers, Inc., John Wiley & Sons, Inc., 2019, 54 pages.

Shamaei et al., "Pseudorange and Multipath Analysis of Positioning with LTE Secondary Synchronization Signals", IEEE Wireless Communications and Networking Conference (WCNC): Special Session Workshops, 2018, 6 pages.

Del Peral-Rosado et al., "Survey of Cellular Mobile Radio Localization Methods: From 1G to 5G", IEEE Communications Surveys & Tutorials, Second Quarter 2018, vol. 20, No. 2, 25 pages.

Chen et al., "Three-Dimensional Positioning for LTE Systems", IEEE Transactions on Vehicular Technology, Apr. 2017, vol. 66, No. 4, 15 pages.

* cited by examiner

POSITIONING METHOD AND COMMUNICATION APPARATUS IN SATELLITE NETWORK

CROSS-REFERENCE TO RELATED APPLICATIONS

This application is a continuation of International Application No. PCT/CN2021/089029, filed on Apr. 22, 2021, which claims priority to Chinese Patent Application No. 202010435378.X, filed on May 21, 2020. The disclosures of the aforementioned applications are hereby incorporated by reference in their entireties.

TECHNICAL FIELD

The embodiments relate to a satellite network, a positioning method, and a communication apparatus in a satellite network.

BACKGROUND

A new radio (NR) technology imposes a higher requirement on positioning of a terrestrial cellular network. For example, for 80% indoor user equipment (UE), horizontal and vertical positioning errors need to be less than 3 m, and an end-to-end latency needs to be less than 1 s. For a self-driving service, high positioning precision at a submeter level (for example, 10 cm) needs to be achieved. A typical positioning technology of a cellular network is a positioning technology based on a time difference of arrival (TDOA). In the TDOA technology, high positioning precision can be achieved by measuring a time difference of arrival of positioning reference signals (PRS) of a plurality of base stations.

However, the TDOA technology is an independent positioning technology, and needs to depend on a PRS that is sent by a base station for positioning. The PRS needs to be sent in a low-interference subframe, and bandwidth resource overheads are high.

SUMMARY

The embodiments may provide a positioning method in a satellite network. A network side does not need to send a PRS, and a terminal device can perform multi-satellite, multi-frequency, and multi-polarization direction measurement, to implement positioning of the terminal device, and reduce bandwidth resource overheads.

According to a first aspect, a positioning method in a satellite network is provided, and is performed by a terminal device. The method includes: receiving a first broadcast signal block of a first satellite; obtaining a measurement value of the first broadcast signal block; obtaining positioning assistance information from the first satellite, where the positioning assistance information indicates information about a second satellite, the information about the second satellite includes a frequency and a polarization direction of the second satellite, and a frequency and/or a polarization direction of the first satellite are/is different from the frequency and the polarization direction of the second satellite; receiving a second broadcast signal block of the second satellite based on the positioning assistance information; obtaining a measurement value of the second broadcast signal block; and obtaining location information of the terminal device based on the measurement value of the first broadcast signal block and the measurement value of the second broadcast signal block.

In the embodiments, the satellite network uses a multi-color reuse mechanism, and each satellite sends a broadcast signal block on a planned frequency and in a planned polarization direction. Therefore, the terminal device measures broadcast signal blocks of at least two satellites and uses the broadcast signal blocks as PRSs for positioning. In this way, the satellite network no longer needs to broadcast a dedicated PRS. The terminal device can receive a broadcast signal block of the satellite network and implement positioning of the terminal device based on a measurement value of the broadcast signal block. Compared with a solution in which the satellite network sends the dedicated PRS, the embodiment may implement passive positioning of the terminal device. This reduces bandwidth resource overheads.

With reference to the first aspect, in some implementations of the first aspect, the obtaining positioning assistance information from the first satellite includes: obtaining a system message of the first satellite based on the first broadcast signal block of the first satellite, where the system message carries the positioning assistance information.

Optionally, the system message may be an SIB message or a MIB message. This is not limited.

Optionally, the broadcast signal block in this embodiment may include, but is not limited to, a synchronization signal block SSB in NR.

With reference to the first aspect, in some implementations of the first aspect, before the terminal device accesses a network, the receiving a first broadcast signal block of a first satellite includes: detecting a broadcast signal block on each frequency and in each polarization direction of a synchronization signal frequency raster, and receiving the first broadcast signal block of the first satellite in a first polarization direction of a detected first frequency.

Before the terminal device accesses the network, the terminal device may receive, by detecting a frequency raster of a broadcast signal block, the broadcast signal block sent by a satellite network side. The terminal device may detect the frequency raster of the broadcast signal block and receive the broadcast signal block from the first satellite in the first polarization direction of the detected first frequency.

With reference to the method in the first aspect, the terminal device further obtains the positioning assistance information from the first satellite, to obtain information about at least one second satellite, and obtain a frequency and a polarization direction of the at least one second satellite. The terminal device receives the broadcast signal block (namely, the second broadcast signal block) of the at least one second satellite on the frequency and in the polarization direction of the at least one second satellite, to obtain the measurement value of the second broadcast signal block. The terminal device may complete positioning of the terminal device based on the measurement value of the first broadcast signal block and the measurement value of the second broadcast signal block of the at least one second satellite.

With reference to the first aspect, in some implementations of the first aspect, the method further includes: selecting, based on the location information of the terminal device, a target satellite to perform random access.

Integrated communication and navigation (ICaN) is a potential development direction of a next generation communication network (including a satellite network and a terrestrial network), and the ICaN can combine advantages of communication and navigation. The terminal device obtains the location information of the terminal device through passive positioning. This greatly simplifies a location management function of a dynamic network (such as a satellite network). In addition, the positioning assistance information is broadcast, so that the ICaN can reduce complexity of searching for a satellite after a terminal device that accesses a network for the first time is powered on.

With reference to the first aspect, in some implementations of the first aspect, when the terminal device is in an idle state or a connected state, the receiving a first broadcast signal block of a first satellite includes: receiving the first broadcast signal block on a frequency and in a polarization direction of a serving satellite of the terminal device, where the first satellite is a serving satellite of the terminal device; and the obtaining positioning assistance information from the first satellite includes: receiving a first message from the serving satellite, where the first message carries the positioning assistance information, and the first message is one of an RRC message, a MAC-CE message, or an SIB message.

When the terminal device is in the idle state or the connected state, the terminal device may obtain a measurement value of a broadcast signal block of the serving satellite by receiving an SSB of the serving satellite on the frequency and in the polarization direction of the serving satellite. In addition, the terminal device obtains the positioning assistance information from the serving satellite, where the positioning assistance information carries the information about the at least one second satellite, and the at least one second satellite usually may be a neighboring satellite of the serving satellite. The terminal device learns of the frequency and the polarization direction of the at least one second satellite based on the information about the at least one second satellite, to receive the broadcast signal block (that is, the second broadcast signal block) of the at least one second satellite on the frequency and in the polarization direction of the at least one second satellite, and obtain the measurement value of the second broadcast signal block. The terminal device may complete positioning of the terminal device based on the measurement value of the first broadcast signal block and the measurement value of the second broadcast signal block of the at least one second satellite.

With reference to the first aspect, in some implementations of the first aspect, the method further includes: selecting, based on the location information of the terminal device, a target satellite to perform cell reselection or cell handover.

The terminal device obtains the location information of the terminal device through passive positioning. This greatly simplifies functions such as cell reselection, cell handover, and cell location management of a dynamic network (such as a satellite network) and reduces a large quantity of control signaling overheads.

With reference to the first aspect, in some implementations of the first aspect, the method includes: obtaining ephemeris information of the first satellite from the system message of the first satellite; and the obtaining location information of the terminal device based on the measurement value of the first broadcast signal block and the measurement value of the second broadcast signal block includes: obtaining the location information of the terminal device based on the measurement value of the first broadcast signal block, the measurement value of the second broadcast signal block of the at least one second satellite, the ephemeris information of the first satellite, and ephemeris information of the at least one second satellite.

With reference to the first aspect, in some implementations of the first aspect, the positioning level information includes at least two positioning levels, the at least two positioning levels are respectively corresponding to different positioning precision, satellite sets of different positioning levels are different, and a satellite set of a higher positioning level includes a larger quantity of satellites; and the receiving a second broadcast signal block of the second satellite based on the positioning assistance information includes: selecting, based on required positioning precision, a satellite set at a positioning level corresponding to the required positioning precision, where the satellite set includes at least one second satellite; and receiving the second broadcast signal block that is of the second satellite and that is included in the satellite set.

This solution supports a plurality of requirements on positioning precision. The terminal device may obtain the positioning assistance information from the satellite network, where the positioning assistance information includes a plurality of positioning precision configurations. The terminal device selects a corresponding positioning precision configuration based on the required positioning precision, and measures broadcast signal blocks of a plurality of satellites based on the selected configuration, to achieve the required positioning precision.

With reference to the first aspect, in some implementations of the first aspect, the selecting, based on the location information of the terminal device, a target satellite includes: selecting the target satellite based on the location information of the terminal device and a requirement of communication quality.

The location information of the terminal device is obtained by performing positioning based on required positioning precision, a parameter indicating the positioning precision includes a geometric dilution of precision (GDOP), and a parameter indicating the communication quality includes reference signal received power (RSRP) and/or reference signal received quality (RSRQ).

When the terminal device selects the target satellite to perform random access for the first time, or performs cell reselection or cell handover, the communication quality is also considered in addition to positioning precision, to meet requirements of both of the positioning precision and the communication quality and ensure adaptation to different positioning and communication requirements of different services.

According to a second aspect, a positioning method in a satellite network is provided. The method includes: A first satellite sends a broadcast signal block; and the first satellite sends positioning assistance information, where the positioning assistance information indicates information about a second satellite, the information about the second satellite includes a frequency and a polarization direction of the second satellite, a frequency and/or a polarization direction of the first satellite are/is different from the frequency and the polarization direction of the second satellite, and the broadcast signal block and the positioning assistance information are used by a terminal device to perform positioning.

With reference to the second aspect, in some implementations of the second aspect, that the first satellite sends positioning assistance information includes: The first satellite sends a system message, where the system message carries the positioning assistance information; or the first satellite sends a first message, where the first message carries the positioning assistance information, and the first message is an RRC message, a MAC-CE message, or an SIB message.

For beneficial effects of the method in the second aspect, refer to descriptions of the first aspect. Details are not described again.

With reference to the second aspect, in some implementations of the second aspect, a measurement value of the broadcast signal block includes one or more of a time of arrival, a frequency of arrival, and an angle of arrival of the broadcast signal block.

In the method according to the first aspect, the second aspect, or any implementation of the first aspect or the second aspect, the system message is an SIB message or a MIB message.

In the method according to the first aspect, the second aspect, or any implementation of the first aspect, the positioning assistance information includes positioning level information and satellite set information, the positioning level information includes one or more items of positioning precision, a positioning latency, and positioning complexity, the satellite set information indicates a satellite set including at least one second satellite, and the satellite set information includes one or more items of the following information of the second satellite: an activation time period of the second satellite, an identifier of the second satellite, a location of the second satellite, ephemeris information of the second satellite, a measurement gap of a broadcast signal block of the second satellite, and the frequency and the polarization direction of the second satellite.

In the method according to the first aspect, the second aspect, or any implementation of the first aspect or the second aspect, the measurement value of the first broadcast signal block is one or more of a time of arrival, a frequency of arrival, and an angle of arrival of the first broadcast signal block, and the measurement value of the second broadcast signal block is one or more of a time of arrival, a frequency of arrival, and an angle of arrival of the second broadcast signal block.

According to a third aspect, a communication apparatus is provided. The communication apparatus has a function of implementing the method according to any one of the first aspect or the possible implementations of the first aspect. The function may be implemented by hardware or may be implemented by hardware executing corresponding software. The hardware or the software includes one or more units corresponding to the foregoing functions.

According to a fourth aspect, the embodiments may provide a communication apparatus. The communication apparatus has a function of implementing the method according to any one of the second aspect or the possible implementations of the second aspect. The function may be implemented by hardware or may be implemented by hardware executing corresponding software. The hardware or the software includes one or more units corresponding to the foregoing functions.

According to a fifth aspect, the embodiments may provide a terminal device, including a processor, a memory, and a transceiver. The memory is configured to store a computer program. The processor is configured to: invoke and run the computer program stored in the memory and control the transceiver to receive and send a signal, so that the terminal device performs the method according to any one of the first aspect or the possible implementations of the first aspect.

According to a sixth aspect, the embodiments may provide a network device, including a processor, a memory, and a transceiver. The memory is configured to store a computer program. The processor is configured to: invoke and run the computer program stored in the memory and control the transceiver to receive and send a signal, so that the network device performs the method according to any one of the first aspect or the possible implementations of the first aspect.

According to a seventh aspect, the embodiments may provide a communication apparatus, including a processor and a communication interface, where the communication interface is configured to receive a signal and transmit the received signal to the processor, and the processor processes the signal, so that the method according to any one of the first aspect or the possible implementations of the first aspect is performed.

According to an eighth aspect, the embodiments may provide a communication apparatus, including a processor and a communication interface, where the communication interface is configured to receive a signal and transmit the received signal to the processor, and the processor processes the signal, so that the method according to any one of the second aspect or the possible implementations of the second aspect is performed.

Optionally, the communication interface may be an interface circuit, and the processor may be a processing circuit.

According to a ninth aspect, the embodiments may provide a non-transitory computer-readable storage medium, where the non-transitory computer-readable storage medium stores computer instructions, and when the computer instructions are run on a computer, the method according to any one of the first aspect or the possible implementations of the first aspect is performed.

According to a tenth aspect, the embodiments may provide a non-transitory computer-readable storage medium, where the non-transitory computer-readable storage medium stores computer instructions, and when the computer instructions are run on a computer, the method according to any one of the second aspect or the possible implementations of the second aspect is performed.

According to an eleventh aspect, the embodiments may provide a computer program product, where the computer program product includes computer program code, and when the computer program code is run on a computer, the method according to any one of the first aspect or the possible implementations of the first aspect is performed.

According to a twelfth aspect, the embodiments may provide a computer program product, where the computer program product includes computer program code, and when the computer program code is run on a computer, the method according to any one of the second aspect or the possible implementations of the second aspect is performed.

According to a thirteenth aspect, the embodiments may provide a wireless communication system, including the terminal device according to the fifth aspect and the network device according to the sixth aspect.

DETAILED DESCRIPTION OF THE EMBODIMENTS

The following describes the embodiments with reference to accompanying drawings.

The embodiments may be applied to a non-terrestrial network (NTN) system such as a satellite communication system or a high-altitude platform station (HAPS) communication system, for example, an integrated communication and navigation (ICaN) system or a global navigation satellite system (GNSS).

The satellite communication system may be integrated with a conventional mobile communication system. For example, the mobile communication system may be a 4th generation (4G) communication system (for example, a long term evolution (LTE) system), a worldwide interoperability for microwave access (WiMAX) communication system, a 5th generation (5G) communication system (for example, a new radio (NR) system), or a mobile communication system in the future.

Figure 1:
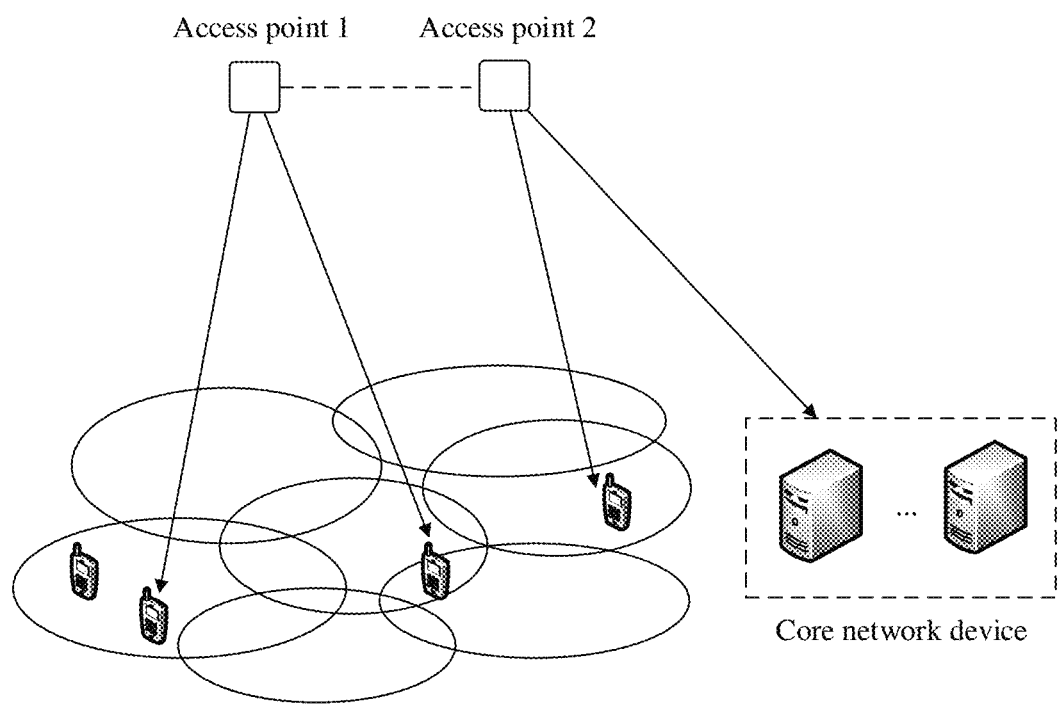
FIG. 1 is an example of a satellite communication system applicable to an embodiment.

FIG. 1 is an example of an architecture of a communication system to which an embodiment may be applicable. As shown in FIG. 1, an access point covers a service area by using a plurality of beams, and different beams may communicate with each other through one or more of time division, frequency division, and space division. The access point provides communication and navigation services for a terminal device, and the access point accesses a core network device. The access point is not limited to a satellite base station or a terrestrial base station. The access point may be deployed on a high-altitude platform or a satellite. The satellite may be a non-geostationary earth orbit (NGEO) satellite or a geostationary earth orbit (GEO) satellite.

The access point may be an evolved NodeB (eNB) in LTE, or a base station in a 5G network or a future evolved public land mobile network (PLMN), a broadband network service gateway (BNG), an aggregation switch, a non-3rd Generation Partnership Project (3GPP) access device, or the like. This is not limited in the embodiments. Optionally, the base station in the embodiments may include base stations in various forms, for example, a macro base station, a micro base station (also referred to as a small cell), a relay station, an access point, a next-generation base station (gNB), a baseband unit (BBU), a transmitting and receiving point (TRP), a transmission point (TP), a mobile switching center, and the like. This is not limited in the embodiments. The satellite mentioned in the embodiments may also be a satellite base station, or a network side device carried on a satellite.

The terminal device mentioned in the embodiments may include various handheld devices, vehicle-mounted devices, wearable devices, computing devices, or other processing devices that have a wireless communication function, and may be user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation security, a wireless terminal in a smart city, a wireless terminal in a smart home, a terminal device in a 5G network or a future communication network, or the like.

In addition, FIG. 1 mentions an access point and a core network device. Unless otherwise specified, a network device mentioned in the following embodiments refers to an access point (or an access network device), for example, a satellite base station.

Figure 2:
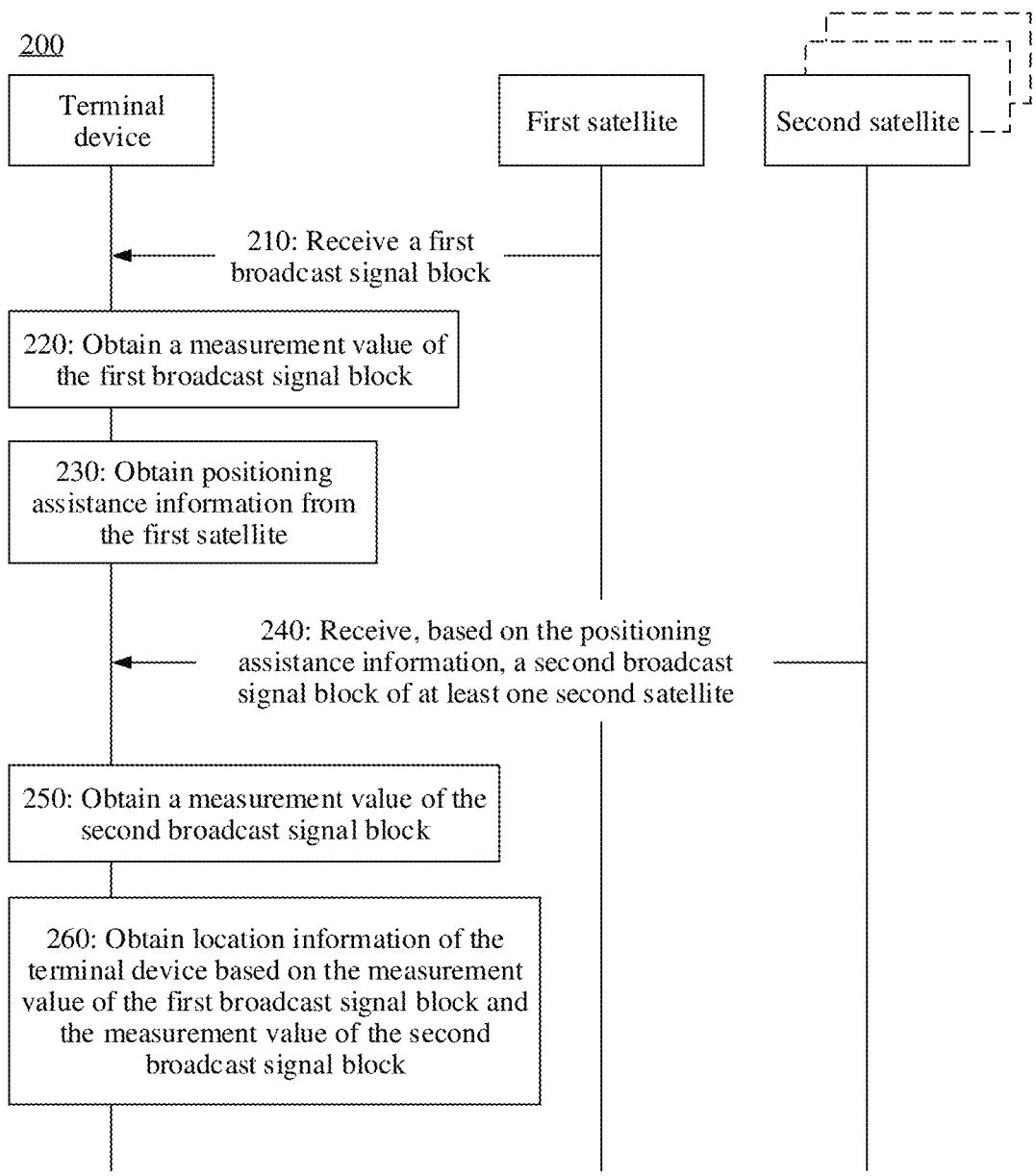
FIG. 2 is a schematic flowchart of a positioning method in a satellite network.

FIG. 2 is a schematic flowchart of a positioning method in a satellite network.

210: A terminal device receives a first broadcast signal block of a first satellite.

In different communication systems, structures and names of broadcast signal blocks may be different.

In an example, in NR, the broadcast signal block may be a synchronization signal block (SSB).

In another example, in long term evolution (LTE), the broadcast signal block may be a primary synchronization signal (PSS) and/or a secondary synchronization signal (SSS) signal.

220: The terminal device obtains a measurement value of the first broadcast signal block.

Optionally, the measurement value of the first broadcast signal block is used by the terminal device to perform positioning, and the measurement value of the first broadcast signal block may be a time of arrival (TOA), a frequency of arrival (FOA), or an angle of arrival (AOA) of the first broadcast signal block.

230: The terminal device obtains positioning assistance information from the first satellite.

The positioning assistance information indicates information about a second satellite, and the information about the second satellite includes a frequency and a polarization direction of the second satellite. A frequency and a polarization direction of the first satellite is different from the frequency and the polarization direction of the second satellite.

In this embodiment, a polarization direction of the satellite is not limited to linear polarization or circular polarization.

Optionally, there may be one or more second satellites. "A plurality of" includes "two" and "more than two".

In an example, the positioning assistance information indicates information about a second satellite, and a frequency and/or a polarization direction of the first satellite are/is different from the frequency and/or the polarization direction of the second satellite. For example, the frequency of the first satellite is different from the frequency of the second satellite. Alternatively, the frequency of the first satellite is the same as the frequency of the second satellite, but the polarization direction of the first satellite is different from the polarization direction of the second satellite. Alternatively, frequencies of the first satellite and the second satellite are different, and polarization directions of the first satellite and the second satellite are different.

In another example, the positioning assistance information indicates information about a plurality of second satellites. In this case, the frequency and/or the polarization direction of the first satellite are/is different from frequencies and/or polarization directions of several second satellites of the plurality of second satellites.

In other words, the first satellite and the second satellite may share frequencies or a combination of a frequency and a polarization direction to send signals (for example, broadcast signal blocks) on respective frequencies and in respective polarization directions.

Figure 3:
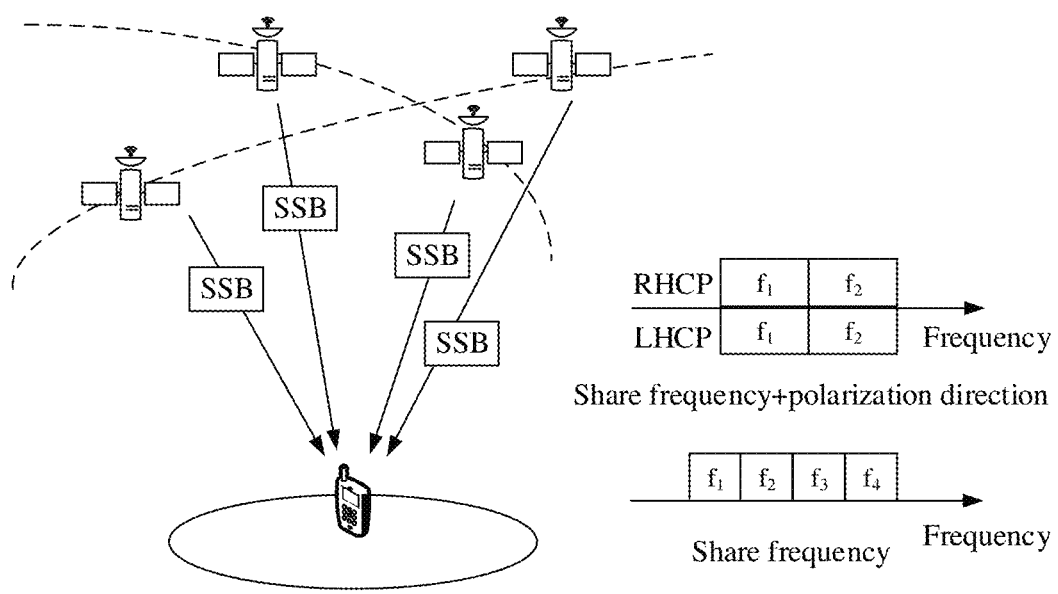
FIG. 3 is a schematic diagram of a frequency and a polarization direction shared by a first satellite and a second satellite.

FIG. 3 is a schematic diagram of a frequency and a polarization direction shared by a first satellite and a second satellite. As shown in FIG. 3, four satellites are used as an example. In a possible implementation, the four satellites share frequencies, and the frequencies of the four satellites are respectively $f_1$, $f_2$, $f_3$, and $f_4$. In this case, the four satellites separately send an SSB on respective frequencies. In another possible implementation, the four satellites share a combination of a frequency and a polarization direction. For example, frequencies of two satellites are $f_1$, and polarization directions of the two satellites are respectively a left-hand circular polarization (LHCP) direction and a right-hand circular polarization (RHCP) direction. In addition, frequencies of the other two satellites are $f_2$, and polarization directions of the two satellites are respectively a left-hand circular polarization direction and a right-hand circular polarization direction.

In addition, because the terminal device may be in different statuses, the terminal device obtains the positioning assistance information from the first satellite in different manners.

In one case, the positioning assistance information is carried in a system message of the first satellite. For example, the positioning assistance information may be carried in a system information block (SIB).

Before the terminal device accesses the satellite network for the first time, the terminal device detects a broadcast signal block on each frequency and in each polarization direction of a synchronization signal frequency raster, receives the first broadcast signal block from the first satellite in a first polarization direction of a detected first frequency, and further receives the system information block. It is assumed that the first broadcast signal block is an SSB in NR. It can be understood from a structure of the SSB in NR that the SSB includes a primary synchronization signal (PSS), a secondary synchronization signal (SSS), and a physical broadcast channel (PBCH). The PBCH indicates information about a PDCCH. The terminal device blindly detects the PDCCH based on the PBCH and receives a PDSCH on a time-frequency resource based on indication information of the PDCCH, to obtain the SIB of the first satellite through demodulation.

In another case, the positioning assistance information is carried in an SIB message, a media access control control element (MAC-CE) message, or a radio resource control (RRC) message of the first satellite.

When the terminal device is in an idle state or a connected state, the terminal device receives an SSB of a serving satellite on a frequency and in a polarization direction of the serving satellite, receives the SIB message of the first satellite based on the SSB, and obtains the positioning assistance information from the SIB message. Alternatively, the terminal device receives a MAC-CE or an RRC message from the serving satellite and obtains the positioning assistance information from the MAC-CE or the RRC message.

240: The terminal device receives a second broadcast signal block of a second satellite based on the positioning assistance information.

It should be understood that the positioning assistance information indicates information about one or more second satellites and includes frequencies and polarization directions of the one or more second satellites. Therefore, the terminal device receives a broadcast signal block of the second satellite on a frequency and in a polarization direction that are of the second satellite and that are indicated by the positioning assistance information. To be distinguished from the first broadcast signal block of the first satellite, the broadcast signal block of the second satellite is referred to as a second broadcast signal block.

250: The terminal device obtains a measurement value of the second broadcast signal block.

The measurement value of the second broadcast signal block includes one or more of a time of arrival, a frequency of arrival, and an angle of arrival of the second broadcast signal block. This is similar to the measurement value of the first broadcast signal block 260: The terminal device obtains location information of the terminal device based on the measurement value of the first broadcast signal block and the measurement value of the second broadcast signal block.

The terminal device obtains the measurement value of the first broadcast signal block by receiving the first broadcast signal block of the first satellite and obtains the measurement value of the second broadcast signal block by receiving the second broadcast signal block of the one or more second satellites. The terminal device may implement positioning of the terminal device based on the first broadcast signal block and the second broadcast signal block according to a positioning algorithm.

The terminal device may determine a difference between the measurement value of the first broadcast signal block and the measurement value of the second broadcast signal block based on the measurement value of the first broadcast signal block and the measurement value of the second broadcast signal block and obtain the location information of the terminal device according to the positioning algorithm in combination with ephemeris information of the first satellite and ephemeris information of the second satellite. The ephemeris information of the first satellite and the ephemeris information of the second satellite may be carried in the system message of the first satellite.

For example, if the terminal device performs positioning based on a time of arrival of the first broadcast signal block and a time of arrival of the second broadcast signal block, the terminal device obtains a time difference of arrival (TDOA) based on the TOA of the first broadcast signal block and the TOA of the second broadcast signal block, and implements positioning of the terminal device based on the TDOA, the ephemeris information of the first satellite, and the ephemeris information of the second satellite according to the positioning algorithm.

In this embodiment, a positioning algorithm is not limited. For example, the positioning algorithm may be a Gauss-Newton algorithm or an extended Kalman filtering (Extended Kalman Filter) algorithm.

The Gauss-Newton algorithm is used an example. A positioning process performed by the terminal device based on the first broadcast signal block of the first satellite and the second broadcast signal block of the at least one second satellite may be as follows:

The following describes an example in which both of the measurement value of the first broadcast signal block and the measurement value of the second broadcast signal block are TOAs.

For example, there is one second satellite. The terminal device obtains a TOA (denoted as TOA 1) of the first broadcast signal block of the first satellite and a TOA (denoted as TOA 2) of the second broadcast signal block of the second satellite, establishes a differential positioning equation based on the TOA 1, the TOA 2, and satellite ephemeris information (for example, location information of the first satellite and location information of the second satellite), and performs a plurality of iterations according to the Gauss-Newton algorithm, to obtain the location information of the terminal device that meets a requirement (for example, a minimum root mean square error criterion) through solving.

For another example, there are two second satellites. The terminal device obtains a TOA (denoted as TOA 1) of the first broadcast signal block of the first satellite and TOAs (denoted as TOA 21 and TOA 22 respectively) of the second broadcast signal blocks of the two second satellites, establishes a differential positioning equation based on the TOA 1, the TOA 21, the TOA 22, and satellite ephemeris information (for example, location information of the first satellite and location information of the two second satellites), and performs a plurality of iterations by using the Gauss-Newton algorithm, to obtain the location information of the terminal device that meets a requirement (for example, a minimum root mean square error criterion) through solving.

For another example, there are three second satellites. The terminal device obtains a TOA (denoted as TOA 1) of the first broadcast signal block of the first satellite and TOAs (denoted as TOA 31, TOA 32, and TOA 33 respectively) of the second broadcast signal blocks of the three second satellites, establishes a differential positioning equation based on the TOA 1, the TOA 31, the TOA 32, the TOA 33, and satellite ephemeris information (for example, location information of the first satellite and location information of the three second satellites), and performs a plurality of iterations by using the Gauss-Newton algorithm, to obtain the location information of the terminal device that meets a requirement (for example, a minimum root mean square error criterion) through solving.

When there are more than three second satellites, a positioning calculation process performed by the terminal device is similar to the foregoing process. Details are not described again.

Optionally, the location information of the terminal device in this embodiment may be longitude and latitude coordinates of the terminal device, XYZ coordinates of a Cartesian or an earth-centered earth-fixed (ECEF) coordinate system, other information or data that can represent a location, or the like. This is not limited.

In the embodiments, a multicolor reuse mechanism is applied in the satellite network, each satellite sends a broadcast signal block on a planned frequency and in a planned polarization direction, and the terminal device reuses the broadcast signal block, so that the broadcast signal block is not only used for time-frequency synchronization in communication, but also used as a positioning reference signal (PRS) for positioning of the terminal device. Therefore, the satellite network no longer needs to broadcast a PRS for positioning of the terminal device. The terminal device may implement positioning of the terminal device by measuring the broadcast signal blocks of the at least two satellites based on the measurement values of the broadcast signal blocks. It should be noted that, in comparison with conventional positioning started based on a request of a terminal device or a network side, in the embodiments, the terminal device may implement positioning of the terminal device by reusing a broadcast signal block of a satellite network. This is passive positioning.

It should be understood that current and future satellite networks are generally ultra-dense and heterogeneous. On the one hand, a scale of the satellite network evolves from 66 Iridium constellations to 720 Oneweb satellites, and finally extends to more than 12,000 starlink ultra-dense low earth orbit satellite constellations. On the other hand, the satellite network is heterogeneous. With development from a conventional single-layer communication network to a multi-layer communication network, functions of a communication satellite network tend to be complex and diversified. The communication satellite network is gradually compatible with and supports functions such as navigation enhancement, ground observation, and multi-dimensional information processing. However, in the current satellite network positioning technology, a dedicated GNSS satellite constellation is deployed, and each satellite periodically broadcasts a reference signal formed based on a clock of the satellite. The terminal device receives reference signals of a plurality of satellites and calculates a pseudo-range to obtain a location of the terminal device.

According to the positioning method in a satellite network, a dedicated GNSS satellite constellation does not need to be deployed, and the satellite network does not need to send a PRS. In other words, passive positioning of the terminal device may be implemented. This reduces bandwidth resource overheads.

Figure 4:
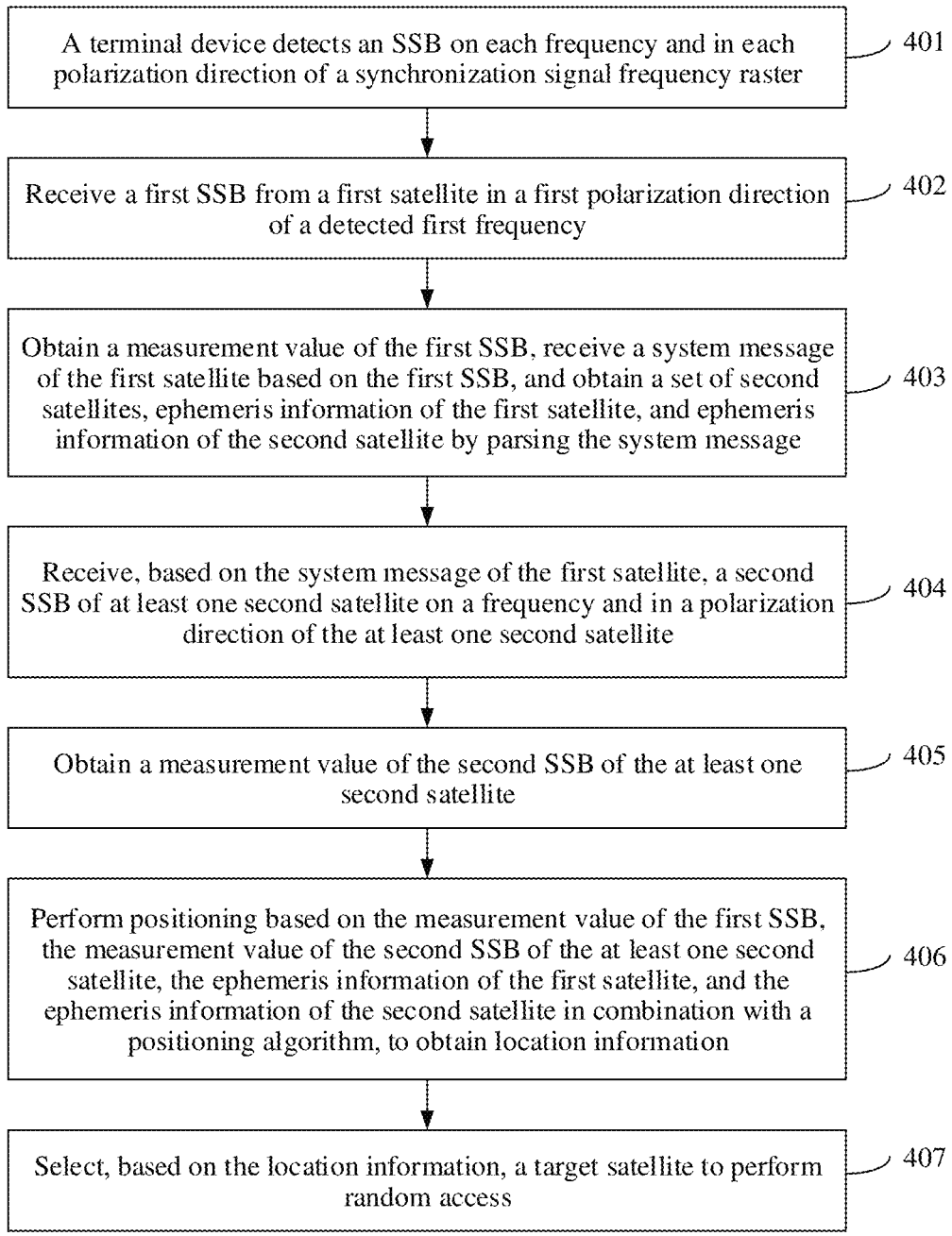
FIG. 4 is an example of a procedure in which a terminal device performs positioning at a stage of initially accessing a network.

Further, after the terminal device completes positioning of the terminal device, the terminal device may access a network or perform a procedure such as cell reselection or cell handover based on a positioning result. The following uses an example for description. With reference to FIG. 4, the following provides a procedure in which the terminal device completes passive positioning of the terminal device in a stage in which the terminal device accesses a satellite network for the first time.

In the following embodiments, an example in which an SSB in NR is used as a broadcast signal block is used for description.

FIG. 4 is an example of a procedure in which the terminal device performs positioning at a stage of initially accessing a network.

401: A terminal device detects an SSB on each frequency and in each polarization direction of an SSB frequency raster.

402: The terminal device receives a first SSB from a first satellite in a first polarization direction of a detected first frequency.

403: The terminal device obtains a measurement value of the first SSB, receives a system message of the first satellite based on the first SSB, and obtains a set of second satellites and ephemeris information of the first satellite and the second satellite by parsing the system message of the first satellite.

It should be understood that the first SSB is an example of the first broadcast signal block.

Optionally, the system message in step 403 is not limited to a main information block (MIB) message or an SIB message.

The system message may include positioning assistance information. The terminal device parses the system message of the first satellite to obtain the positioning assistance information in the system message of the first satellite. The positioning assistance information indicates information about one or more second satellites, and the information about the second satellite includes at least a frequency and a polarization direction of the second satellite.

In this embodiment, a set including the one or more second satellites indicated by the positioning assistance information is referred to as a set of second satellites.

In addition, the system message of the first satellite further carries the ephemeris information of the first satellite and ephemeris information of the one or more second satellites.

404: The terminal device receives, based on the system message of the first satellite, a second SSB of at least one second satellite on a frequency and in a polarization direction of the at least one second satellite.

The second SSB is an example of the second broadcast signal block.

405: The terminal device obtains a measurement value of each second SSB of the at least one second satellite.

406: The terminal device performs positioning on the terminal device based on the measurement value of the first SSB of the first satellite, the measurement value of the second SSB of the at least one second satellite, and the ephemeris information of the first satellite and the second satellite in combination with a positioning algorithm, to obtain location information.

For a positioning process in step 406, refer to the foregoing description of step 260. Details are not described again.

407: The terminal device selects, based on the location information of the terminal device, a target satellite to perform random access.

Figure 5:
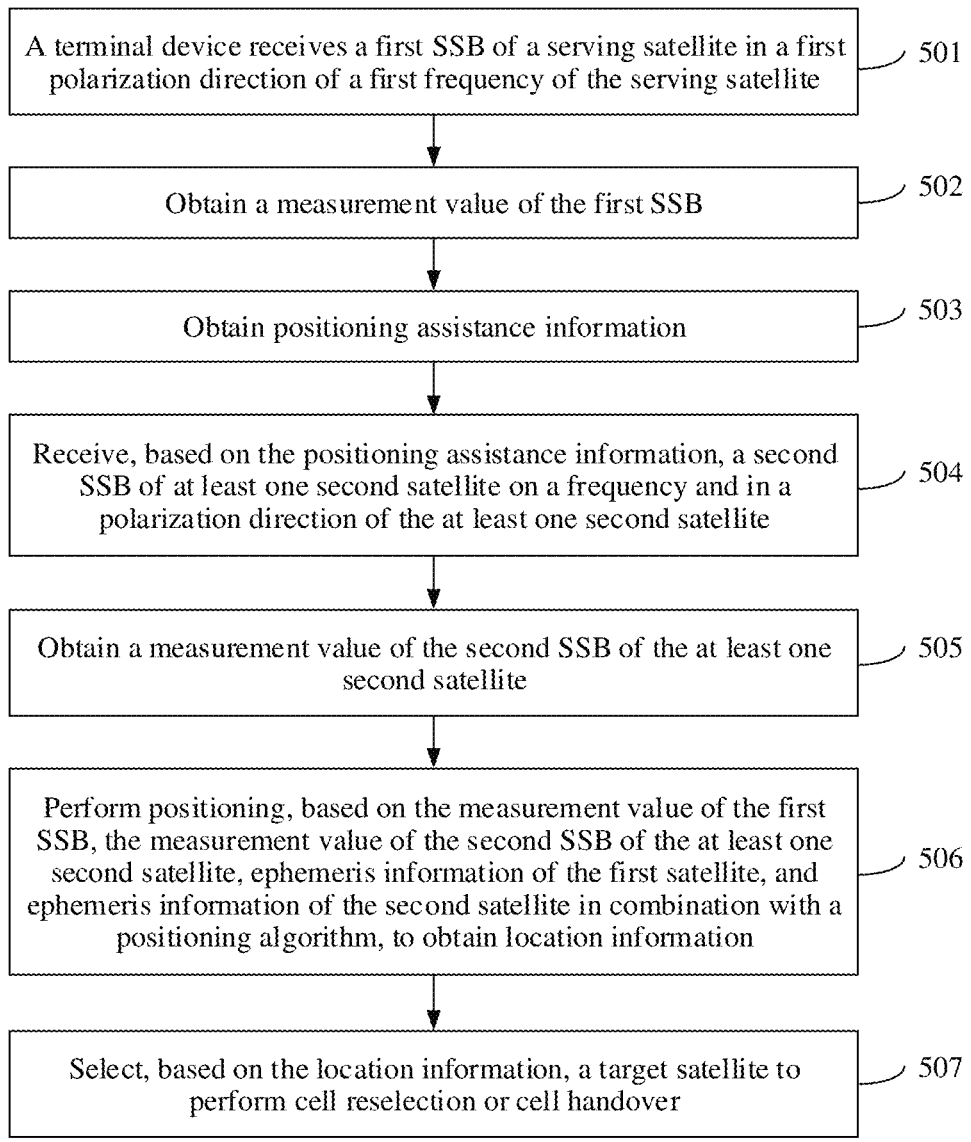
FIG. 5 is an example of a procedure of performing positioning when a terminal device is in an idle state or a connected state.

In a stage in which the terminal device accesses a network for the first time, the satellite network does not need to send a dedicated positioning reference signal, and the terminal device may perform passive positioning by reusing an SSB of the satellite, to obtain a location of the terminal device. With reference to FIG. 5, the following provides a process in which a terminal device completes passive positioning of the terminal device when the terminal device is in an idle state or a connected state.

FIG. 5 is an example of a procedure of performing positioning when the terminal device is in the idle state or the connected state.

501: A terminal device receives a first SSB of a serving satellite in a first polarization direction of a first frequency of the serving satellite.

502: The terminal device obtains a measurement value of the first SSB of the serving satellite.

503: The terminal device obtains positioning assistance information.

Optionally, when the terminal device is in the idle state or the connected state, the terminal device may obtain the positioning assistance information from a satellite network in a plurality of manners.

In an example, the positioning assistance information may be carried in a system message of the serving satellite, for example, an SIB message.

In another example, the positioning assistance information is carried in a MAC-CE message or an RRC message sent by the serving satellite to the terminal device. The terminal device obtains the positioning assistance information by parsing the SIB message, the MAC-CE message, or the RRC message of the serving satellite.

The positioning assistance information indicates information about one or more second satellites, and the information about the second satellite includes at least a frequency and a polarization direction of the second satellite.

In addition, the terminal device obtains ephemeris information of the serving satellite and ephemeris information of the one or more second satellites by parsing the system message of the serving satellite.

504: The terminal device receives, based on the positioning assistance information, a second SSB of at least one second satellite on a frequency and in a polarization direction of the at least one second satellite.

505: The terminal device obtains a measurement value of each second SSB of the at least one second satellite.

506: The terminal device performs positioning, based on the measurement value of the first SSB of the serving satellite, the measurement value of the second SSB of the at least one second satellite, the ephemeris information of the serving satellite, and ephemeris information of the at least one second satellite in combination with a positioning algorithm, to obtain location information of the terminal device.

For a positioning process in step 506, refer to the foregoing description of step 260. Details are not described again.

507: The terminal device selects, based on the location information of the terminal device, a target satellite to perform cell reselection or cell handover.

When the terminal device is in the idle state or the connected state, the terminal device does not need to send a dedicated positioning reference signal by using a satellite network and may perform passive positioning by reusing SSBs of a serving satellite and a neighboring satellite of the serving satellite, to complete positioning of the terminal device.

It should be understood that the neighboring satellite of the satellite is variable. The neighboring satellite of the satellite refers to a satellite whose distance from the satellite is less than a given threshold.

Optionally, if the positioning method is applied to an integrated communication and navigation (ICaN) satellite system, a name of the positioning assistance information in the foregoing embodiments may be ICaN positioning.

A message format of ICaN positioning may be shown as follows:

```
-- ASN1STOP -- ASN1START
-- TAG-ICAN_Positioning-START
ICAN_Positioning ::=            SEQUENCE {
   PositioningPriority          INTEGER (1..N)
   SatelliteGroup   ::= SEQUENCE {
      TimeDuration/Status
      Satellite ID
      Satellite Location
      MeasurementGap
      Frequency/Polarization
      ......
}
-- TAG-ICAN_Positioning-STOP
-- ASN1STOP
```

As shown above, ICaN positioning may include two parts: a positioning level (that is, PositioningPriority) and a satellite set (that is, SatelliteGroup).

The positioning level is used to represent a requirement on positioning precision of the terminal device, and may be represented by using positioning precision, a positioning latency, positioning complexity, and the like. Different positioning levels correspond to different positioning precision.

The satellite set indicates a set of satellites of corresponding positioning levels, and may include one or more of the following attributes:

an activation time duration (TimeDuration/Status) of a satellite, an identifier of a satellite (Satellite ID), a satellite location, ephemeris information of a satellite, a measurement gap, and a frequency or a polarization direction of a satellite.

The ephemeris information of the satellite may be an ephemeris table of the satellite. The ephemeris table is a precise position, speed, or track table that varies with the time. The ephemeris table is a function of time and determines a time, coordinates, an azimuth, a speed, and other parameters of a satellite based on a mathematical relationship between six orbit parameters of Kepler's law. The six orbit parameters are respectively a square root of a semi-major axis, an eccentricity, an argument of perigee, a mean anomaly, a longitude of ascending node, and an orbit inclination.

Optionally, in an example, the positioning level information of the positioning assistance information includes at least two positioning levels, the at least two positioning levels are respectively corresponding to different positioning precision, satellite sets of different positioning levels are different, and a satellite set of a higher positioning level includes a larger quantity of satellites.

The following uses an example in which the positioning level information includes two positioning levels to describe the message format of ICaN positioning with a plurality of pieces of positioning precision.

For example, the message format of ICaN positioning including two positioning levels (that is, corresponding to two pieces of positioning precision) may be shown as follows:

```
-- ASN1STOP -- ASN1START
-- TAG-ICAN_Positioning-START
ICAN_Positioning ::=              SEQUENCE {
    PositioningPriority           0
    SatelliteGroup   ::= SEQUENCE {
       Satellite 1, Satellite 2, Satellite 3, Satellite 4
    }
    PositioningPriority           1
    SatelliteGroup   ::= SEQUENCE {
       Satellite 1, Satellite 2, Satellite 5, Satellite 6, Satellite 7, Satellite 8
    }
-- TAG-ICAN_Positioning-STOP
-- ASN1STOP
```

Two positioning levels are listed in the format of the foregoing example: a positioning level 0 and a positioning level 1. It can be understood that a satellite set corresponding to the positioning level 0 includes four satellites: a satellite 1, a satellite 2, a satellite 3, and a satellite 4. A satellite set corresponding to the positioning level 1 includes six satellites: a satellite 1, a satellite 2, a satellite 5, a satellite 6, a satellite 7, and a satellite 8. A quantity of satellites included in the satellite set corresponding to the positioning level 1 is greater than a quantity of satellites included in the satellite set corresponding to the positioning level 0. Therefore, positioning precision of the positioning level 1 is higher than positioning precision of the positioning level 0. For example, the positioning level 1 corresponds to positioning precision of 10 m, and the positioning level 0 corresponds to positioning precision of 100 m.

The terminal device needs to measure four satellites, to meet a requirement of positioning precision corresponding to the positioning level 0, and measure six satellites, to meet a requirement of positioning precision corresponding to the positioning level 1.

In the foregoing example, the two positioning levels (that is, the positioning level 0 and the positioning level 1) are merely used as examples, and satellite identifiers carried in satellite sets respectively corresponding to the two positioning levels are also used as examples to illustrate that satellite sets corresponding to different positioning levels include different quantities of satellites, and should not constitute a limitation on implementation.

For example, an equipotential level may also be classified into a level A, a level B, a level C, a level D, and the like. A satellite set corresponding to the level A includes two satellites: a satellite 1 and a satellite 2. A satellite set corresponding to the level B includes three satellites: a satellite 2, a satellite 5, and a satellite 6. A satellite set corresponding to the level C includes four satellites: a satellite 5, a satellite 6, a satellite 7, and a satellite 8. A satellite set corresponding to the level D includes six satellites: a satellite 1, a satellite 3, a satellite 4, a satellite 5, a satellite 6, a satellite 8.

Optionally, the at least two positioning levels included in the positioning assistance information may be all positioning levels configured on a satellite network side, or a part of a plurality of positioning levels configured on a satellite network side. This is not limited in the embodiments.

According to the positioning procedure described above, after the terminal device obtains the positioning assistance information, the terminal device selects, based on positioning levels of at least two pieces of positioning precision configured in positioning level information of the positioning assistance information and required positioning precision, a proper positioning level from the positioning assistance information, and measures a satellite in a satellite set corresponding to the selected positioning level.

FIG. 4 and FIG. 5 describe processes in which the terminal device performs positioning in different scenarios. After the terminal device completes positioning of the terminal device, the terminal device selects, based on a location of the terminal device, a target satellite to perform initial random access, cell reselection, cell handover, or the like.

It can be understood from a positioning procedure of the terminal device that at least one positioning level is configured in the positioning assistance information sent by the satellite network side. The terminal device selects a corresponding positioning level based on a requirement on positioning precision and measures a satellite in a satellite set of the positioning level, to implement required positioning precision. In other words, the terminal device performs positioning based on the required positioning precision and obtains a positioning result of the required positioning precision. On this basis, the terminal device selects, based on positioning of the terminal device, the target satellite to complete initial random access, cell reselection, or cell handover. In this case, only a positioning requirement needs to be considered when the target satellite is selected.

In another embodiment, when the terminal device selects the target satellite to perform random access, cell reselection, or cell handover, the terminal device not only needs to consider a positioning requirement, but also needs to consider a communication requirement, to ensure communication quality after the terminal device accesses the target satellite or completes cell handover or cell reselection.

the positioning requirement may be measured by using parameters indicating positioning precision, a positioning latency, positioning complexity, and the like, and the communication requirement may be represented by using parameters indicating communication quality.

In an embodiment, a parameter indicating the positioning precision may be a geometric dilution of precision (GDOP), and a parameter indicating the communication quality may be signal quality, for example, reference signal received power (RSRP) or reference signal received quality (RSRQ).

The GDOP may be delivered by the satellite network side to the terminal device, and the signal quality may be obtained by the terminal device by measuring a signal on the satellite network side. For example, the RSRP or the RSRQ obtained by the terminal device by measuring broadcast signal blocks (for example, SSBs) of a plurality of satellites may represent communication quality of different satellites. In addition, the signal quality may generally represent not only the communication quality, but also the positioning requirement.

In an implementation, the terminal device may select the target satellite in one of the following manners.

First manner:

A·signal quality+B·GDOP.

A represents a weight of signal quality, B represents a weight of a GDOP, the signal quality can represent positioning precision and communication quality, the GDOP can represent communication quality, and · represents a multiplication operation.

Optionally, the signal quality may be RSRP or RSRQ measured by the terminal, or a value obtained after RSRP or RSRQ normalization. This is not limited.

In the first manner, the terminal device adjusts values of A and B based on different positioning requirements and communication requirements, to adapt to a required communication requirement and a required positioning requirement.

In some examples, A=0.5, and B=0.5, A=0.3, and B=0.7, or the like.

The terminal device selects a satellite whose A·signal·quality+B·GDOP value meets a threshold or whose value is the largest as the target satellite.

Second Manner:

Signal quality is greater than a threshold 1, or GDOP is less than a threshold 2; or signal quality is greater than a threshold 1, and GDOP is less than a threshold 2.

A larger threshold 1 indicates higher communication quality, and a higher threshold 2 indicates lower positioning precision.

In the second manner, different thresholds 1 and 2 are set to ensure different service requirements, for example, adapt to both of a required communication requirement and a required positioning requirement.

The terminal device selects a satellite that meets the foregoing threshold condition as the target satellite.

In some examples, the threshold 1=—80 dBm, and the threshold 2=1.5, or the threshold 1=—90 dBm, and the threshold 2=3.

It should be understood that integrated communication and navigation is a potential development direction of a next-generation communication network (including a satellite network and a terrestrial network). ICaN can use communication networks to implement submeter-level and high-precision positioning, and effectively meet location-based service requirements, such as self-driving and smart transportation. In addition, the ICaN can implement complementary advantages of communication and navigation. For communication, location information is obtained through navigation or positioning. This can implement efficient networking of a network, greatly simplify functions such as cell reselection, cell handover, and cell location management of a dynamic network (such as a satellite network), reduce a large quantity of control signaling overheads, and support location-based wide area network access. For navigation, a communication function is introduced. This can implement navigation enhancement, improve positioning precision, distribute information such as an ephemeris of a satellite by using a communication network, reduce complexity of searching for a satellite after a terminal device is powered on, and improve a positioning speed of accessing a network for the first time.

The foregoing describes in detail the positioning method in a satellite network. The following describes a communication apparatus.

Figure 6:
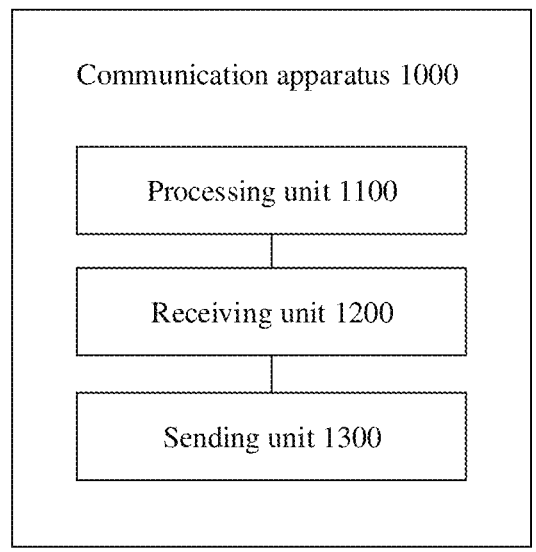
FIG. 6 is a schematic block diagram of a communication apparatus.

FIG. 6 is a schematic block diagram of a communication apparatus. As shown in FIG. 6, a communication apparatus 1000 includes a processing unit 1100, a receiving unit 1200, and a sending unit 1300.

The receiving unit 1200 is configured to receive a first broadcast signal block of a first satellite.

The processing unit 1100 is configured to obtain a measurement value of the first broadcast signal block.

The processing unit 1100 is further configured to obtain positioning assistance information from the first satellite, where the positioning assistance information indicates information about a second satellite, the information about the second satellite includes a frequency and a polarization direction of the second satellite, and a frequency and/or a polarization direction of the first satellite are/is different from the frequency and/or the polarization direction of the second satellite.

The receiving unit 1200 is further configured to receive a second broadcast signal block of the second satellite based on the positioning assistance information.

The processing unit 1100 is further configured to obtain a measurement value of the second broadcast signal block.

The processing unit 1100 is further configured to obtain location information of the communication apparatus based on the measurement value of the first broadcast signal block and the measurement value of the second broadcast signal block.

Optionally, in an embodiment, the receiving unit 1200 is configured to:

obtain a system message of the first satellite based on the first broadcast signal block of the first satellite, where the system message carries the positioning assistance information.

Optionally, in some examples, the system message is an SIB message or a MIB message.

Optionally, in another embodiment, before the communication apparatus accesses a network, the receiving unit 1200 is further configured to:

detect a broadcast signal block on each frequency and in each polarization direction of a synchronization signal frequency raster and receive the first broadcast signal block of the first satellite in a first polarization direction of a detected first frequency.

Optionally, in another embodiment, the processing unit 1100 is further configured to:

select, based on the location information of the communication apparatus, a target satellite to perform random access.

Optionally, in another embodiment, when the communication apparatus is in an idle state or a connected state, the receiving unit 1200 is further configured to:

receive the first broadcast signal block on a frequency and in a polarization direction of a serving satellite, where the first satellite is a serving satellite of the communication apparatus; and receive a first message from the first satellite, where the first message carries the positioning assistance information, and the first message is one of an RRC message, a MAC-CE message, or an SIB message.

Optionally, in an embodiment, the processing unit 1100 is further configured to:

select, based on the location information of the communication apparatus, a target satellite to perform cell reselection or cell handover.

Optionally, in another embodiment, the positioning assistance information includes positioning level information and satellite set information, the positioning level information includes one or more items of positioning precision, a positioning latency, and positioning complexity, the satellite set information indicates a satellite set including at least one second satellite, and the satellite set information includes one or more items of the following information of the second satellite:

an activation time period of the second satellite, an identifier of the second satellite, a location of the second satellite, ephemeris information of the second satellite, a measurement gap of a broadcast signal block of the second satellite, and the frequency and the polarization direction of the second satellite.

Optionally, in another embodiment, the processing unit 1100 is further configured to:

obtain ephemeris information of the first satellite from the system message of the first satellite; and obtain the location information of the communication apparatus based on the measurement value of the first broadcast signal block, the measurement value of the second broadcast signal block of the at least one second satellite, the ephemeris information of the first satellite, and ephemeris information of the at least one second satellite.

Optionally, in another embodiment, the positioning level information includes at least two positioning levels, the at least two positioning levels are respectively corresponding to different positioning precision, satellite sets of different positioning levels are different, and a satellite set of a higher positioning level includes a larger quantity of satellites.

The processing unit 1100 is further configured to select, based on required positioning precision, a satellite set at a positioning level corresponding to the required positioning precision, where the satellite set includes at least one second satellite.

The receiving unit 1200 is further configured to receive the second broadcast signal block that is of the second satellite and that is included in the satellite set.

Optionally, in another embodiment, the processing unit 1100 is further configured to:

select a target satellite based on the location information of the communication apparatus and a requirement of communication quality.

The location information of the communication apparatus is obtained by performing positioning based on required positioning precision, a parameter indicating the positioning precision includes a geometric dilution of precision (GDOP), and a parameter indicating the communication quality includes reference signal received power (RSRP), and/or reference signal received quality (RSRQ).

Optionally, in the foregoing embodiments, the measurement value of the first broadcast signal block is one or more of a time of arrival, a frequency of arrival, and an angle of arrival of the first broadcast signal block, and the measurement value of the second broadcast signal block is one or more of a time of arrival, a frequency of arrival, and an angle of arrival of the second broadcast signal block.

In the foregoing implementations, the receiving unit 1200 and the sending unit 1300 may also be integrated into one transceiver unit and have both of a receiving function and a sending function. This is not limited herein.

Optionally, in an example, the communication apparatus 1000 may be the terminal device in the method embodiments. In this case, the receiving unit 1200 may be a receiver, and the sending unit 1300 may be a transmitter. Alternatively, the receiver and the transmitter may be integrated into a transceiver.

Optionally, in another example, the communication apparatus 1000 may be a chip or an integrated circuit in a terminal device. In this case, the receiving unit 1200 and the sending unit 1300 may be a communication interface or an interface circuit. For example, the receiving unit 1200 is an input interface or an input circuit, and the sending unit 1300 is an output interface or an output circuit.

In each example, the processing unit 1100 is configured to perform processing and/or operations implemented inside the terminal device in addition to sending and receiving actions.

The processing unit 1100 may be a processing apparatus. A function of the processing apparatus may be implemented by hardware or may be implemented by hardware executing corresponding software. For example, the processing apparatus may include at least one processor and at least one memory. The at least one memory is configured to store a computer program. The at least one processor reads and executes the computer program stored in the at least one memory, to enable the communication apparatus 1000 to perform operations and/or processing performed by the terminal device in the method embodiments.

Optionally, the processing apparatus may include only the processor, and the memory configured to store the computer program is located outside the processing apparatus. The processor is connected to the memory through a circuit/wire to read and execute the computer program stored in the memory.

Optionally, in some examples, the processing apparatus may alternatively be a chip or an integrated circuit. For example, the processing apparatus includes a processing circuit/logic circuit and an interface circuit. The interface circuit is configured to: receive a signal and/or data and transmit the signal and/or the data to the processing circuit. The processing circuit processes the signal and/or the data, so that operations and/or processing performed by the terminal device in the method embodiments are/is performed.

Figure 7:
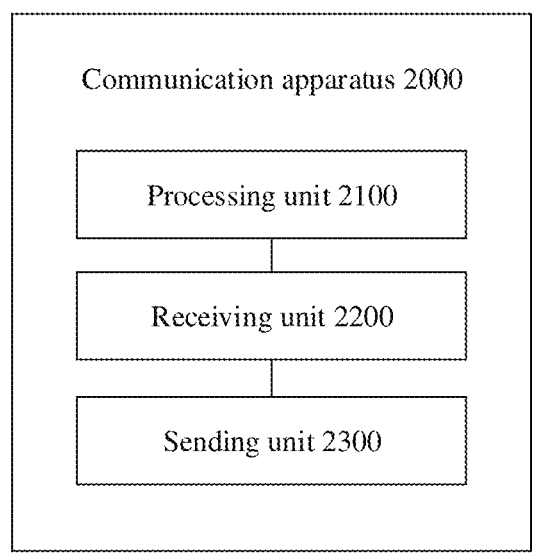
FIG. 7 is a schematic block diagram of another communication apparatus.

FIG. 7 is a schematic block diagram of another communication apparatus. As shown in FIG. 7, a communication apparatus 2000 includes a processing unit 2100, a receiving unit 2200, and a sending unit 2300.

The sending unit 2300 is configured to send a broadcast signal block.

The sending unit 2300 is configured to send positioning assistance information, where the positioning assistance information indicates information about a second satellite, the information about the second satellite includes a frequency and a polarization direction of the second satellite, a frequency and/or a polarization direction of the communication apparatus are/is different from the frequency and/or the polarization direction of the second satellite, and the broadcast signal block and the positioning assistance information are used by a terminal device to perform positioning.

Optionally, in an embodiment, the sending unit 2300 is configured to send a system message, where the system message carries the positioning assistance information.

Alternatively, the sending unit 2300 is configured to send a first message, where the first message carries the positioning assistance information, and the first message is an RRC message, a MAC-CE message, or an SIB message.

Optionally, in another embodiment, the positioning assistance information includes positioning level information and satellite set information, the positioning level information includes one or more items of positioning precision, a positioning latency, and positioning complexity, the satellite set information indicates a satellite set including at least one second satellite, and the satellite set information includes one or more items of the following information of the second satellite:

an activation time period of the second satellite, an identifier of the second satellite, a location of the second satellite, ephemeris information of the second satellite, a measurement gap of a broadcast signal block of the second satellite, and the frequency and the polarization direction of the second satellite.

Optionally, in another embodiment, the positioning level information includes at least two positioning levels, the at least two positioning levels are respectively corresponding to different positioning precision, satellite sets of different positioning levels are different, and a satellite set of a higher positioning level includes a larger quantity of satellites.

Optionally, in another embodiment, a measurement value of the broadcast signal block includes one or more of a time of arrival, a frequency of arrival, and an angle of arrival of the broadcast signal block.

In the foregoing implementations, the receiving unit 2200 and the sending unit 2300 may also be integrated into one transceiver unit and have both of a receiving function and a sending function. This is not limited herein.

Optionally, in an example, the communication apparatus 2000 may be a satellite or a network device in the method embodiments or may be a chip applied to a satellite or another network device. In this case, the receiving unit 2200 may be a receiver, and the sending unit 2300 may be a transmitter. Alternatively, the receiver and the transmitter may be integrated into a transceiver.

Optionally, in another example, the communication apparatus 2000 may be a chip or an integrated circuit in a network device. In this case, the receiving unit 2200 and the sending unit 2300 may be a communication interface or an interface circuit. For example, the receiving unit 2200 is an input interface or an input circuit, and the sending unit 2300 is an output interface or an output circuit.

In each example, the processing unit 2100 is configured to perform processing and/or operations implemented inside the network device in addition to sending and receiving actions.

The processing unit 2100 may be a processing apparatus. A function of the processing apparatus may be implemented by hardware or may be implemented by hardware executing corresponding software. For example, the processing apparatus may include at least one processor and at least one memory. The at least one memory is configured to store a computer program. The at least one processor reads and executes the computer program stored in the at least one memory, to enable the communication apparatus 2000 to perform operations and/or processing performed by the network device in the method embodiments.

Optionally, the processing apparatus may include only the processor, and the memory configured to store the computer program is located outside the processing apparatus. The processor is connected to the memory through a circuit/wire to read and execute the computer program stored in the memory.

Optionally, in some examples, the processing apparatus may alternatively be a chip or an integrated circuit. For example, the processing apparatus includes a processing circuit/logic circuit and an interface circuit. The interface circuit is configured to: receive a signal and/or data and transmit the signal and/or the data to the processing circuit. The processing circuit processes the signal and/or the data, so that operations performed by the network device in the method embodiments are performed.

Figure 8:
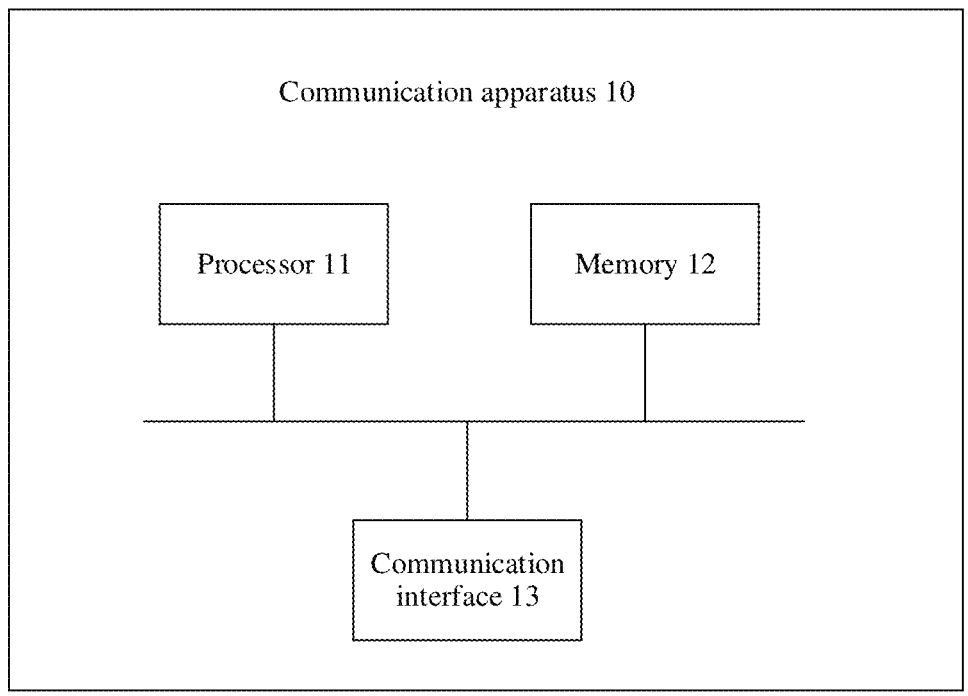
FIG. 8 is a schematic diagram of a structure of a communication apparatus.

FIG. 8 is a schematic diagram of a structure of a communication apparatus. As shown in FIG. 8, a communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program, so that procedures and/or operations performed by the terminal device in the method embodiments are performed.

For example, the processor 11 may have a function of the processing unit 1100 shown in FIG. 6, and the communication interface 13 may have functions of the receiving unit 1200 and/or the sending unit 1300 shown in FIG. 6. The processor 11 may be configured to perform processing or operations performed internally by the terminal device in FIG. 1 to FIG. 5, and the communication interface 13 may be configured to perform sending and/or receiving actions performed by the terminal device in FIG. 1 to FIG. 5.

In an implementation, the communication apparatus 10 may be the terminal device in the method embodiments. In this implementation, the communication interface 13 may be a transceiver. The transceiver may include a receiver and a transmitter. Optionally, the processor 11 may be a baseband apparatus, and the communication interface 13 may be a radio frequency apparatus. In another implementation, the communication apparatus 10 may be a chip or an integrated circuit installed in a terminal device. In this implementation, the communication interface 13 may be an interface circuit or an input/output interface.

Figure 9:
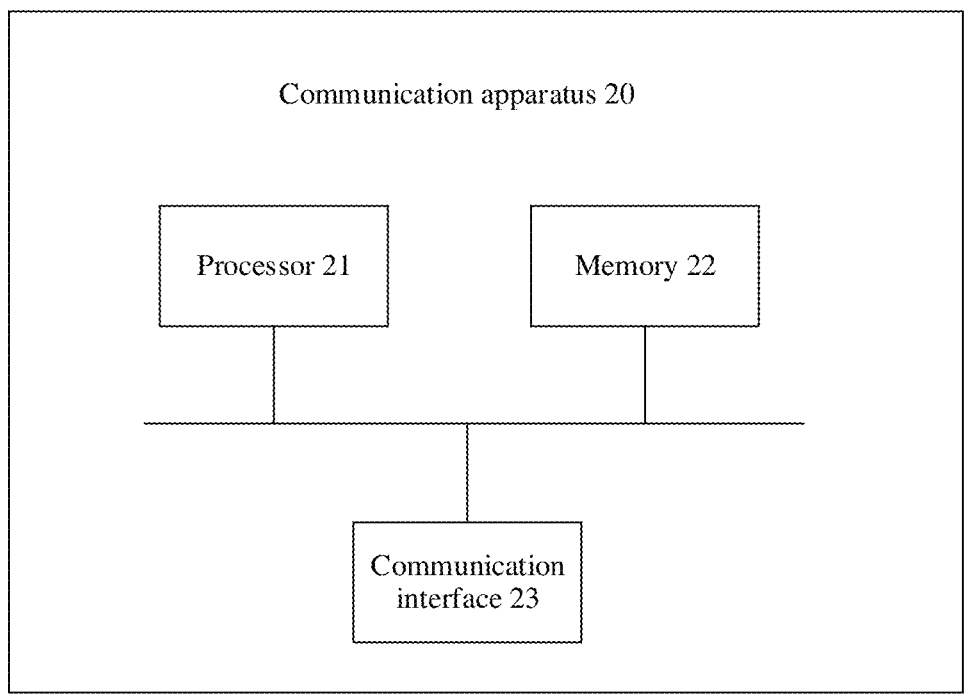
FIG. 9 is a schematic diagram of a structure of another communication apparatus.

FIG. 9 is a schematic diagram of a structure of another communication apparatus. As shown in FIG. 9, a communication apparatus 20 includes one or more processors 21, one or more memories 22, and one or more communication interfaces 23. The processor 21 is configured to control the communication interface 23 to receive and send a signal. The memory 22 is configured to store a computer program. The processor 21 is configured to invoke the computer program from the memory 22 and run the computer program, so that procedures and/or operations performed by the network device in the method embodiments are performed.

For example, the processor 21 may have a function of the processing unit 2100 shown in FIG. 7, and the communication interface 23 may have functions of the receiving unit 2200 and/or the sending unit 2300 shown in FIG. 7. The processor 21 may be configured to perform processing or operations performed internally by the network device in FIG. 1 to FIG. 5, and the communication interface 33 may be configured to perform sending and/or receiving actions performed by the network device in FIG. 1 to FIG. 5.

In an implementation, the communication apparatus 20 may be the network device in the method embodiments. In this implementation, the communication interface 23 may be a transceiver. The transceiver may include a receiver and a transmitter. Optionally, the processor 21 may be a baseband apparatus, and the communication interface 23 may be a radio frequency apparatus. In another implementation, the communication apparatus 20 may be a chip or an integrated circuit installed in a network device. In this implementation, the communication interface 23 may be an interface circuit or an input/output interface.

Optionally, the memory and the processor in the foregoing apparatus embodiments may be physically independent units, or the memory may be integrated into the processor. This is not limited in the embodiments.

In addition, the embodiments may further provide a non-transitory computer-readable storage medium. The non-transitory computer-readable storage medium stores computer instructions. When the computer instructions are run on a computer, operations and/or procedures performed by the terminal device in the method embodiments are performed.

The embodiments may further provide a non-transitory computer-readable storage medium. The non-transitory computer-readable storage medium stores computer instructions. When the computer instructions are run on a computer, operations and/or procedures performed by the network device in the method embodiments are performed.

In addition, the embodiments may further provide a computer program product. The computer program product includes computer program code or instructions. When the computer program code or the instructions is/are run on a computer, operations and/or procedures performed by the terminal device in the method embodiments are performed.

the embodiments may further provide a computer program product. The computer program product includes computer program code or instructions. When the computer program code or the instructions is/are run on a computer, operations and/or procedures performed by the network device in the method embodiments are performed.

In addition, the embodiments may further provide a chip. The chip includes a processor. A memory configured to store a computer program is disposed independent of the chip. The processor is configured to execute the computer program stored in the memory, to perform operations and/or processing performed by the terminal device in any method embodiment.

Further, the chip may include a communication interface. The communication interface may be an input/output interface, an interface circuit, or the like. Further, the chip may include the memory.

The embodiments may further provide a chip. The chip includes a processor. A memory configured to store a computer program is disposed independent of the chip. The processor is configured to execute the computer program stored in the memory, to perform operations and/or processing performed by the network device in any method embodiment.

Further, the chip may include a communication interface. The communication interface may be an input/output interface, an interface circuit, or the like. Further, the chip may include the memory.

In addition, the embodiments may further provide a communication apparatus (for example, may be a chip), including a processor and a communication interface. The communication interface is configured to receive a signal and transmit the signal to the processor. The processor processes the signal, so that operations and/or processing performed by the terminal device in any method embodiment are performed.

The embodiments may further provide a communication apparatus (for example, may be a chip), including a processor and a communication interface. The communication interface is configured to receive a signal and transmit the signal to the processor. The processor processes the signal, so that operations and/or processing performed by the network device in any method embodiment are performed.

In addition, the embodiments may further provide a communication apparatus, including at least one processor, where the at least one processor is coupled to at least one memory, and the at least one processor is configured to execute a computer program or instructions stored in the at least one memory, so that operations and/or processing performed by the terminal device in any method embodiment are performed.

The embodiments may further provide a communication apparatus, including at least one processor, where the at least one processor is coupled to at least one memory, and the at least one processor is configured to execute a computer program or instructions stored in the at least one memory, so that operations and/or processing performed by the network device in any method embodiment are performed.

In addition, the embodiments may further provide a communication device, including a processor, a memory, and a transceiver. The memory is configured to store a computer program. The processor is configured to: invoke and run the computer program stored in the memory and control the transceiver to receive and send a signal, so that the terminal device performs operations and/or processing performed by the terminal device in any method embodiment.

The embodiments may further provide a communication device, including a processor, a memory, and a transceiver. The memory is configured to store a computer program. The processor is configured to: invoke and run the computer program stored in the memory and control the transceiver to receive and send a signal, so that the terminal device performs operations and/or processing performed by the network device in any method embodiment.

In addition, the embodiments may further provide a wireless communication system, including the terminal device and the network device in the embodiments.

The processor in the embodiments may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods in the embodiments may be directly performed and completed by a hardware encoding processor or may be performed and completed by a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the embodiments may be a volatile memory, a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and may be used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in the embodiments includes, but is not limited to, these and any memory of another proper type.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments may be integrated into one processing unit, each of the units may exist alone physically, or two or more units may be integrated into one unit.

The term "and/or" describes only an association relationship for describing associated objects and represents that there may be three relationships. For example, A and/or B may represent the following three cases: only A exists, both A and B exist, and only B exists. A, B, and C each may be singular or plural. This is not limited.

In the embodiments, words such as "first" and "second" are used to distinguish between same items or similar items having basically same functions and effects. A person skilled in the art may understand that the terms such as "first" and "second" do not limit a quantity or an execution sequence, and the terms such as "first" and "second" do not indicate a definite difference.

When the functions are implemented in the form of a software functional unit and sold or used as an independent product, the functions may be stored in a non-transitory computer-readable storage medium. Based on such an understanding, the embodiments essentially, or the part contributing to the conventional technology, or some of the embodiments may be implemented in a form of a software product. The computer software product is stored in a non-transitory storage medium and includes several instructions for instructing a computer device (which may be a personal computer, a server, or a network device) to perform all or some of the steps of the methods described in the embodiments.

The foregoing description details implementations of the embodiments, but is not intended to limit the scope of the embodiments. Any variation or replacement readily figured out by a person skilled in the art shall fall within the scope of the embodiments.

What is claimed is:

1. A positioning method in a satellite network, the method comprising:
    receiving, by a terminal device, a first broadcast signal block of a first satellite;
    obtaining, by the terminal device, a measurement value of the first broadcast signal block;
    obtaining, by the terminal device, positioning assistance information from the first satellite, wherein the positioning assistance information indicates information about a second satellite, the information about the second satellite comprises a frequency and a polarization direction of the second satellite, and a frequency and/or a polarization direction of the first satellite are/is different from the frequency and the polarization direction of the second satellite;
    receiving, by the terminal device, a second broadcast signal block of the second satellite based on the positioning assistance information;
    obtaining, by the terminal device, a measurement value of the second broadcast signal block; and
    obtaining, by the terminal device, location information of the terminal device based on the measurement value of the first broadcast signal block and the measurement value of the second broadcast signal block.

2. The positioning method according to claim 1, wherein obtaining, by the terminal device, the positioning assistance information from the first satellite further comprises:
    obtaining, by the terminal device, a system message of the first satellite based on the first broadcast signal block of the first satellite, wherein the system message carries the positioning assistance information.

3. The positioning method according to claim 2, wherein before the terminal device accesses the satellite network, receiving, by the terminal device, the first broadcast signal block of the first satellite further comprises:
    detecting, by the terminal device, a broadcast signal block on each frequency and in each polarization direction of a synchronization signal frequency raster; and receiving the first broadcast signal block of the first satellite in a first polarization direction of a detected first frequency.

4. The positioning method according to claim 3, further comprising:
selecting, by the terminal device based on the location information of the terminal device, a target satellite to perform random access.

5. The positioning method according to claim 1, wherein, when the terminal device is in an idle state or a connected state, receiving, by the terminal device, the first broadcast signal block of the first satellite further comprises:
receiving, by the terminal device, the first broadcast signal block on a frequency and in a polarization direction of a serving satellite, wherein the first satellite is a serving satellite of the terminal device; and obtaining, by the terminal device, the positioning assistance information from the first satellite further comprises:
receiving, by the terminal device, a first message from the serving satellite, wherein the first message carries the positioning assistance information, and the first message is one of a radio resource control (RRC) message, a media access control control element (MAC-CE) message, or a system information block (SIB) message.

6. The positioning method according to claim 5, further comprising:
selecting, by the terminal device based on the location information of the terminal device, a target satellite to perform cell reselection or cell handover.

7. The positioning method according to claim 1, wherein the positioning assistance information comprises positioning level information and satellite set information, the positioning level information comprises one or more items of positioning precision, a positioning latency, and positioning complexity, the satellite set information indicates a satellite set comprising at least one second satellite, and the satellite set information comprises one or more items of the following information of the second satellite:
an activation time period of the second satellite, an identifier of the second satellite, a location of the second satellite, ephemeris information of the second satellite, a measurement gap of a broadcast signal block of the second satellite, and the frequency and the polarization direction of the second satellite.

8. The positioning method according to claim 7, further comprising:
obtaining, by the terminal device, ephemeris information of the first satellite from the system message of the first satellite; and obtaining, by the terminal device, the location information of the terminal device based on the measurement value of the first broadcast signal block and the measurement value of the second broadcast signal block further comprises:
obtaining, by the terminal device, the location information of the terminal device based on a measurement value of a first SSB, the measurement value of the second broadcast signal block of the at least one second satellite, the ephemeris information of the first satellite, and ephemeris information of the at least one second satellite.

9. The positioning method according to claim 1, wherein the measurement value of the first broadcast signal block is one or more of a time of arrival, a frequency of arrival, and an angle of arrival of the first broadcast signal block, and the measurement value of the second broadcast signal block is one or more of a time of arrival, a frequency of arrival, and an angle of arrival of the second broadcast signal block.

10. A positioning method in a satellite network, the method comprising:
sending, by a first satellite, a broadcast signal block; and
sending, by the first satellite, positioning assistance information, wherein the positioning assistance information indicates information about a second satellite, the information about the second satellite comprises a frequency and a polarization direction of the second satellite, a frequency and/or a polarization direction of the first satellite are/is different from the frequency and the polarization of the second satellite, and the broadcast signal block and the positioning assistance information are used by a terminal device to perform positioning.

11. The positioning method according to claim 10, wherein sending, by the first satellite, the positioning assistance information further comprises:
sending, by the first satellite, a system message, wherein the system message carries the positioning assistance information; or
sending, by the first satellite, a first message, wherein the first message carries the positioning assistance information, and the first message is one of an RRC message, a MAC-CE message, or an SIB message.

12. The positioning method according to claim 10, wherein the positioning assistance information comprises positioning level information and satellite set information, the positioning level information comprises one or more items of positioning precision, a positioning latency, and positioning complexity, the satellite set information indicates a satellite set comprising at least one second satellite, and the satellite set information comprises one or more items of the following information of the second satellite:
an activation time period of the second satellite, an identifier of the second satellite, a location of the second satellite, ephemeris information of the second satellite, a measurement gap of a broadcast signal block of the second satellite, and the frequency and the polarization direction of the second satellite.

13. The positioning method according to claim 12, wherein the positioning level information comprises at least two positioning levels, the at least two positioning levels are respectively corresponding to different positioning precision, satellite sets of different positioning levels are different, and a satellite set of a higher positioning level comprises a larger quantity of satellites.

14. A communication apparatus, comprising a processor, coupled to at least one memory storing computer code or instructions, wherein when the computer code or the instructions is/are executed by the processor, the computer code or the instructions cause the apparatus to:
receive a first broadcast signal block of a first satellite;
obtain a measurement value of the first broadcast signal block;
obtain positioning assistance information from the first satellite, wherein the positioning assistance information indicates information about a second satellite, the information about the second satellite comprises a frequency and a polarization direction of the second satellite, and a frequency and/or a polarization direction of the first satellite are/is different from the frequency and the polarization direction of the second satellite;
receive a second broadcast signal block of the second satellite based on the positioning assistance information;
obtain a measurement value of the second broadcast signal block; and obtain location information of the apparatus based on the measurement value of the first broadcast signal block and the measurement value of the second broadcast signal block.

15. The communication apparatus according to claim 14, wherein when the computer code or the instructions is/are executed by the processor, the computer code or the instructions further cause the apparatus to:
obtain a system message of the first satellite based on the first broadcast signal block of the first satellite, wherein the system message carries the positioning assistance information.

16. The communication apparatus according to claim 15, when the computer code or the instructions is/are executed by the processor, the computer code or the instructions further cause the apparatus to:
detect a broadcast signal block on each frequency and in each polarization direction of a synchronization signal frequency raster, and
receive the first broadcast signal block of the first satellite in a first polarization direction of a detected first frequency.

17. The communication apparatus according to claim 16, when the computer code or the instructions is/are executed by the processor, the computer code or the instructions further cause the apparatus to:
select based on the location information of the apparatus, a target satellite to perform random access.

18. The communication apparatus according to claim 14, wherein when the computer code or the instructions is/are executed by the processor, the computer code or the instructions further cause the apparatus to:
in response to the apparatus is in an idle state or a connected state, receive the first broadcast signal block on a frequency and in a polarization direction of a serving satellite, wherein the first satellite is a serving satellite of the apparatus;
receive a first message from the serving satellite, wherein the first message carries the positioning assistance information, and the first message is one of a radio resource control (RRC) message, a media access control control element (MAC-CE) message, or a system information block (SIB) message.

19. The communication apparatus according to claim 14, wherein the positioning assistance information comprises positioning level information and satellite set information, the positioning level information comprises one or more items of positioning precision, a positioning latency, and positioning complexity, the satellite set information indicates a satellite set comprising at least one second satellite, and the satellite set information comprises one or more items of the following information of the second satellite:
an activation time period of the second satellite, an identifier of the second satellite, a location of the second satellite, ephemeris information of the second satellite, a measurement gap of a broadcast signal block of the second satellite, and the frequency and the polarization direction of the second satellite.

20. The communication apparatus according to claim 14, wherein the measurement value of the first broadcast signal block is one or more of a time of arrival, a frequency of arrival, and an angle of arrival of the first broadcast signal block, and the measurement value of the second broadcast signal block is one or more of a time of arrival, a frequency of arrival, and an angle of arrival of the second broadcast signal block.

* * * * *